United States Patent
Duarte

(10) Patent No.: US 6,236,461 B1
(45) Date of Patent: May 22, 2001

(54) LASER SENSITOMETER USING MULTIPLE-PRISM BEAM EXPANSION AND A POLARIZER

(75) Inventor: Francisco J. Duarte, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/219,042

(22) Filed: Dec. 23, 1998

(51) Int. Cl.$^7$ .................................................. G01N 21/00
(52) U.S. Cl. ........................ 356/443; 356/432; 356/224
(58) Field of Search ................................. 356/300, 443, 356/432, 224

(56) References Cited

U.S. PATENT DOCUMENTS

| | | |
|---|---|---|
| 3,677,653 | 7/1972 | Hocker et al. . |
| 5,053,619 | 10/1991 | Arimoto . |
| 5,255,069 | 10/1993 | Duarte . |

OTHER PUBLICATIONS

"On a Generalized Interference Equation and Interferometric Measuremets" published in Optics Communications, vol. 103, No. 1, 2 by F.J. Duarte pp. 8–14.

"Interferometric Imaging" published in Tunable Laser Applications by F.J. Duarte, pp. 153–177.

"Narrow–Linewidth Laser Oscillators and Intracavity Dispersion" published in Tunable Lasers Handbook by F.J. Duarte, pp. 9–32.

Primary Examiner—Frank G. Font
Assistant Examiner—Reginald D. Ratliff
(74) Attorney, Agent, or Firm—Susan L. Parulski

(57) ABSTRACT

An electro-optical apparatus particularly suitable for exposing a sample of light sensitive material to provide a graded series of exposures of different intensity levels. The apparatus includes a light source, beam shaping optics, and a rotatable polarizer. The light source provides a Gaussian beam of light directed along an optical axis. The beam shaping optics are disposed in the optical path and are adapted to expand the Gaussian beam of light into an elongated beam of light and to project the elongated beam of light along the optical axis toward a sample. The rotatable polarizer, disposed in the optical path intermediate the light source and the beam shaping optics, is rotated to vary the intensity level of the beam of light.

19 Claims, 5 Drawing Sheets

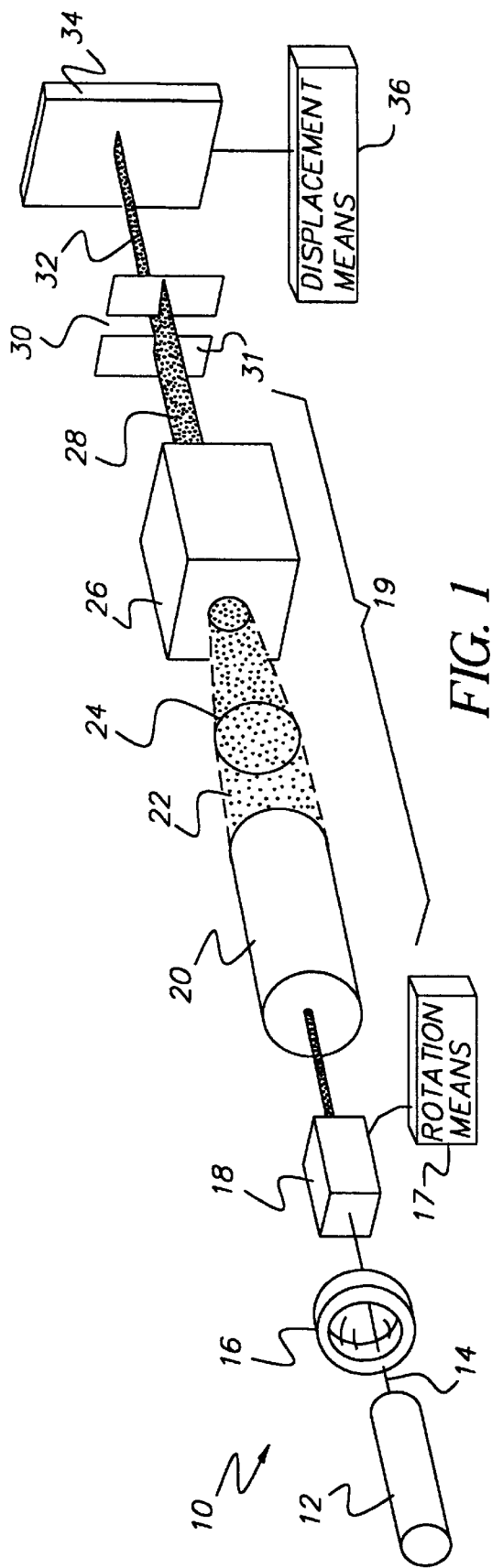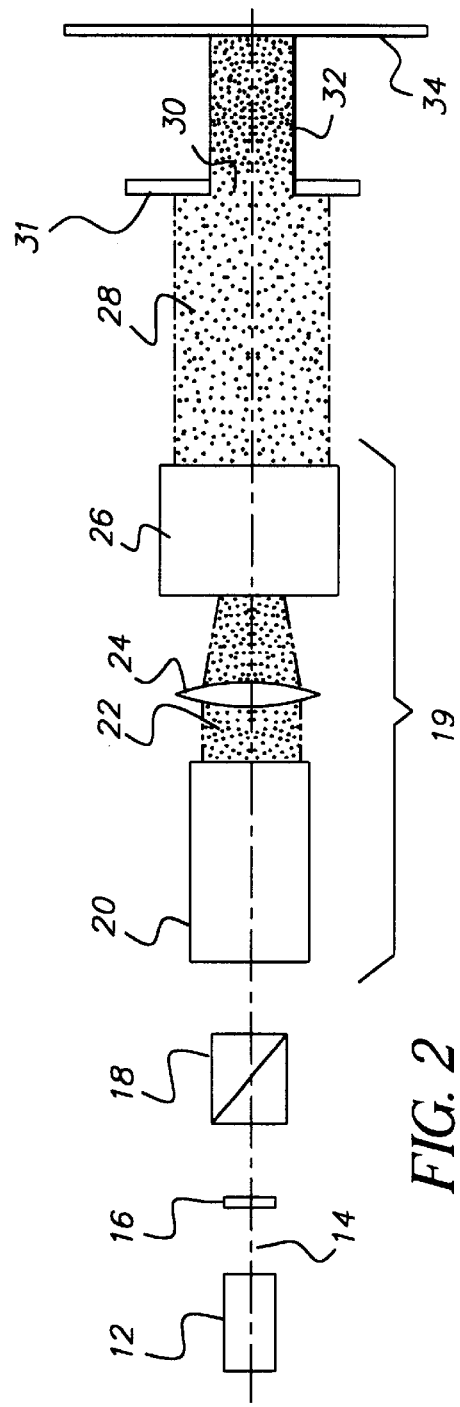

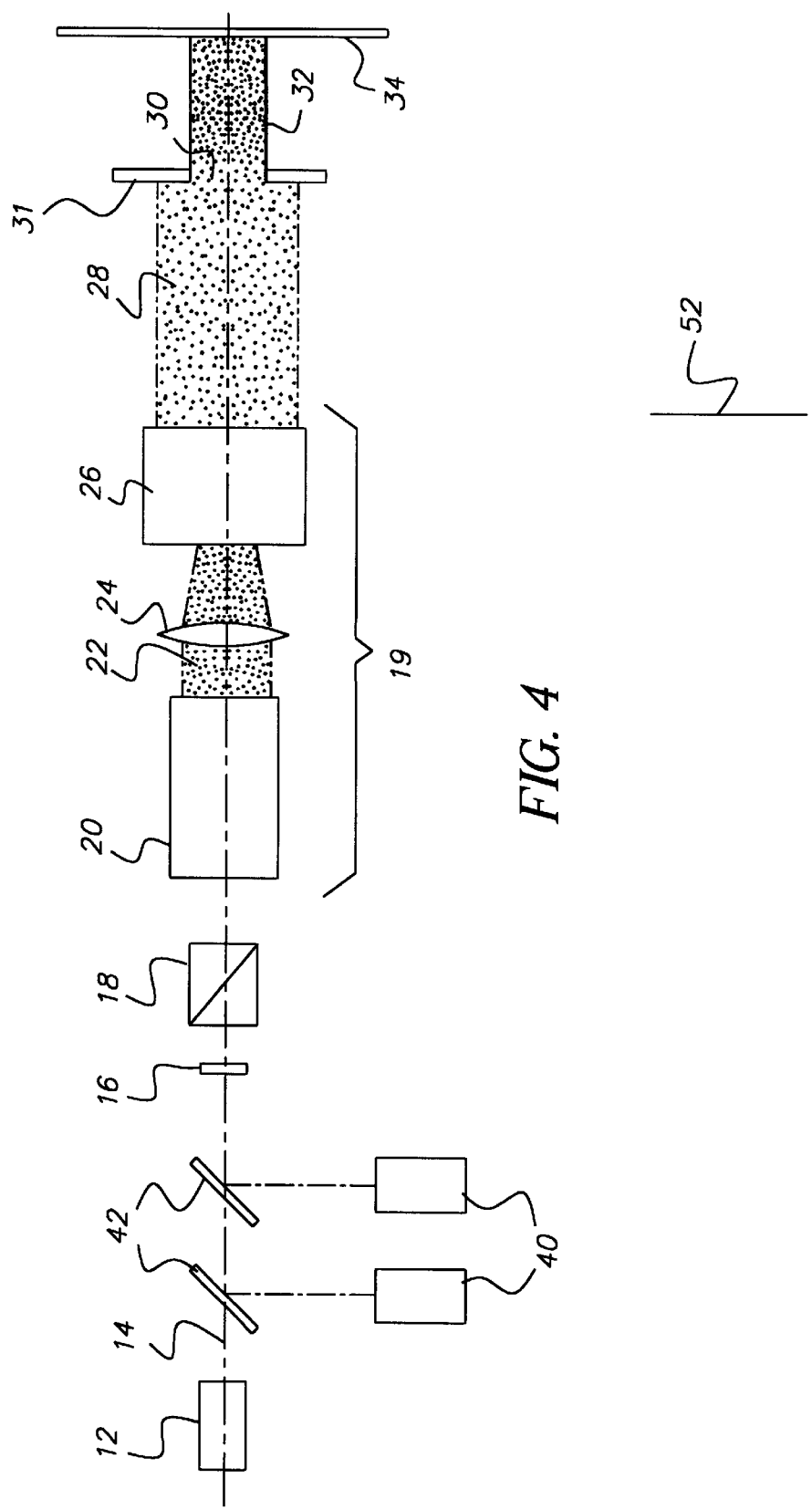

LASER SENSITOMETER USING MULTIPLE-PRISM BEAM EXPANSION AND A POLARIZER

FIELD OF THE INVENTION

This invention relates to a laser sensitometer designed to expose light sensitive material or other imaging surfaces to a series of intensity levels and at various wavelengths.

BACKGROUND OF THE INVENTION

Sensitometers are well known in the photographic art as apparatus for making sensitometric test strips from light-sensitive material (such as photographic paper or film) to determine the resolution response from the material. A sensitometer generally comprises a light source and means for producing a graded series of exposures (also referred to as line exposures) of the light-sensitive material being tested, such as an optical wedge having a series of steps of known absorbing power.

U.S. Pat. No. 3,677,653 (Hocker) teaches a sensitometer wherein a laser and a negative lens forward of the laser are used as the means for producing a divergent coherent monochromatic light beam. When it is desired to make a sensitometric test strip of the light-sensitive material, the light-sensitive material is placed in contact with the optical wedge. The laser directs a beam through the steps of various density of the optical wedge and impinge upon the front surface of the light-sensitive material being tested. The light-sensitive material is then developed by conventional means and the characteristics of the light-sensitive material are determined by methods and apparatus already known in the art. While such an apparatus may be suitable for its intended purpose, the dimensions of the divergent laser beam change rapidly as a function of distance, thus making it difficult to control the exposure densities.

Other known methods of producing a graded series of exposures (also referred to as line exposures) of the light-sensitive material involve the displacement of a light beam (or laser beam) following reflection on a rotating prism or rotating polygon. A rapid scanning of the light beam caused by the rotating prism or polygon also produces a exposure time. U.S. Pat. No. 5,053,619 (Arimoto) relates to an optical system using rotating polygons. Rotating prisms and/or rotating polygons are expensive optomechanical components. Further, their use requires mechanical rotation at very high rotational speeds, for example, in the range of 20,000–40,000 revolutions/minute, and such high rotational speeds introduce/increase mechanical maintenance.

A known method to vary and control the laser intensity on an exposure is the use an acuosto-optical modulator (AOM). However, the use of AOMs imposes beam focusing constraints, energy density limitations, and require sophisticated electronics for control. Polygon mirrors, used in optical scanning, and AOMs are described in the "Handbook of Optics", Volume II, edited by M. Bass, McGraw-Hill, N.Y., 1995.

Accordingly, a need continues to exist for a reliable laser sensitometer which has an optical structure that is compact, optically rugged, and does not incorporate a rotating prism, rotating polygon, or an AOM.

SUMMARY OF THE INVENTION

An object of the present invention is to provide an improved laser sensitometer.

Another object of the invention is to provide such a laser sensitometer which has an optical structure that is compact, optically rugged, and does not incorporate rotating prisms or polygons, nor AOMs.

Still another object of the invention is to provide such a laser sensitometer which has reduced mechanical maintenance.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an electro-optical apparatus including a light source, beam shaping optics, and a rotatable polarizer. The light source is adapted to provide a Gaussian beam of light directed along an optical axis. The beam shaping optics are disposed in the optical path and adapted to expand the Gaussian beam of light into an elongated beam of light and to project the elongated beam of light along the optical axis toward a sample. The rotatable polarizer, disposed in the optical path intermediate the light source and the beam shaping optics, is rotated to vary the intensity level of the beam of light.

According to another aspect of the present invention, there is provided a method for exposing a sample of light sensitive material to provide a graded series of exposures of different intensity levels. The method includes the steps of: generating a Gaussian beam of light directed along an optical axis toward a sample of light sensitive material; directing the generated Gaussian beam of light through a rotatable polarizer; expanding the polarized beam of light into an elongated beam of light; projecting the elongated beam of light onto the sample; displacing the sample in a plane transverse to the optical axis and the plane of propagation; and repeat the steps of directing, expanding, projecting, and displacing until an exposure area with a desired dimension is obtained.

Accordingly, the present invention discloses an optical structure that does not employ an AOM or a high speed rotating prism or polygon. As such, the present invention provides a reliable, compact, optically rugged, simple, and reduced cost laser sensitometer.

BRIEF DESCRIPTION OF THE DRAWINGS

FIG. 1 shows a perspective view of an electro-optical apparatus in accordance with the present invention having a single laser source of illumination.

FIG. 2 shows a schematic diagram of the electro-optical apparatus of FIG. 1 in accordance with the present invention.

FIG. 4 shows an electro-optical apparatus in accordance with the present invention having three laser sources of illumination.

FIG. 7 shows a single exposure obtained with the electro-optical apparatus of the present invention.

DETAILED DESCRIPTION OF THE INVENTION

Figure 3:
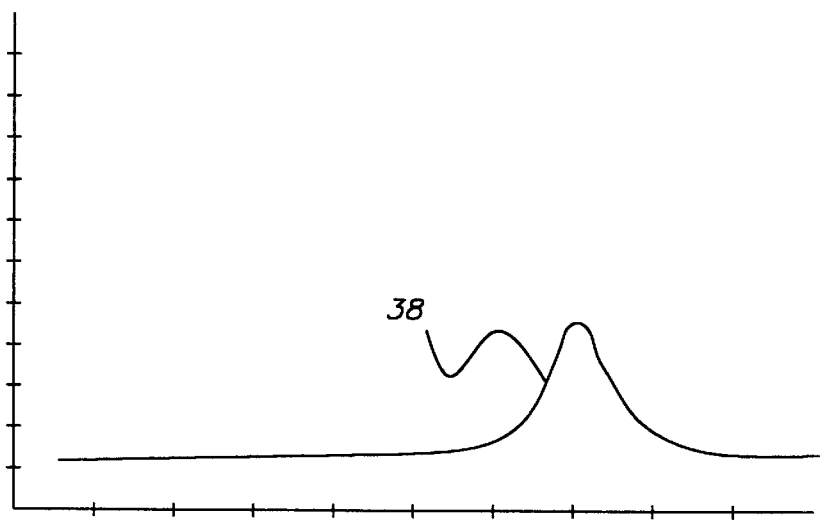
FIG. 3 shows a temporal pulse of a pulsed diode-pumped frequency-doubled Nd:YAG laser, with the temporal scale being 100 ns.

The present invention applies the principle of one dimensional beam expansion used in conjunction with a wide optical aperture to produce a line exposure previously achieved by scanning a laser beam at high speed either using a rotating prism or polygon. The desired exposure time is achieved using a pulsed laser. The different intensity levels of exposure are achieved by precise low speed rotation of a polarizer. The polarizer offers substantially higher power density characteristics without imposing constraints on the laser beam dimensions.

FIGS. 1 and 2 show, in schematic form, an electro-optical apparatus 10 constructed in accordance with the present invention. Apparatus 10 comprises a light source 12 which projects a beam of light along an optical axis 14. Light source 12 is a pulsed laser, polarized parallel to the plane of propagation. Light source 12 is a pulsed laser rather than a continuous wave laser so as to provide an exposure time. A suitable pulsed laser yields 500 to 10,000 pulses per second and has a pulse length in at least the 10 to 1000 ns range. An example of a suitable light source 12 is a gas or HeNe laser operated in the pulsed mode which provides a polarized single transverse mode ($TEM_{00}$) substantially pure Gaussian beam. Another suitable light source 12 is a diode-pumped frequency-doubled solid-state laser, such as a Nd:YAG laser, operated in the pulsed domain. Such a solid-state laser can deliver pulses in the 10–1000 ns range. An alternative light source 12 is a $Kr^+$ laser operated in a pulsed mode. Such a laser emits in several transitions in the blue-red region of the spectrum at wavelengths of approximately 476.2 nm, 482.5 nm, 520.8 nm, 530.9 nm, 568.2 nm, and 647.1 nm. A description of Gaussian beam propagation is available in the book titled "Tunable Laser Applications", by F. J. Duarte, Marcel-Dekker, New York, 1995.

The beam from light source 12 passes through an optional neutral density filter 16 and a rotatable polarizer 18 and is projected onto a beam-shaping optics 19. Polarizer 18 is rotated by rotation means 17 known to those skilled in the art. Beam-shaping optics 19 includes a telescope 20, a convex lens 24, and a one-dimensional multiple-prism beam expander 26. Telescope 20 can be Galilean or Newtonian. The telescope provides a two-dimensional magnification factor, for example, of about twenty. The beam from telescope 20, indicated at 22, is generally circular and passes through convex lens 24. Convex lens 24 focuses the beam onto one-dimensional multiple-prism beam expander 26 as described in "Tunable Laser Applications", F. J. Duarte, Editor, Marcel-Dekker, New York, 1995, Chapter 5. This multiple-prism beam expander uses two or more right angle prisms deployed to expand the Gaussian beam by a factor of 2, 5, 10, or more as necessary.

The beam from expander 26, indicated at 28, is a narrow and elongated substantially pure Gaussian beam. This beam is directed through a variable width opening or aperture 30 in an opaque material 31 (such as metal) positioned with the aperture's center along optical axis 14. Aperture 30 is oriented so as to provide transmission of a central portion, indicated at 32, of the substantially pure Gaussian beam. Central portion 32 is directed onto a sample 34, for example a photographic film, and illuminates and exposes the sample or imaging plane. The illumination intensity profile on the sample can be determined using interference/diffraction theory, and will be further described below. Sample 34 is displaceable in a direction transverse to the propagation plane and transverse to the optical axis by displacement means 36 known to those skilled in the art.

Note that upon immediate exit of multiple-prism expander 26, the beam is preferably about 10 mm thick and about 30–50 mm wide. Thus, a ratio of height to width is about 1:3.5 to 1:5. As the beam of light moves towards the imaging plane (i.e., sample) the beam gets thinner, and may be as thin as 25 micrometers. Consequently, in the absence of an aperture, at the imaging plane, the beam may be about 25–100 micrometers in height and about 30–50 mm in width. Thus, the ratio of height to width can be as much as 1 to 2000. This is generally referred to as an extremely elongated Gaussian beam. While actual dimensions of the rectangular beam can be selected, Applicants have found that a suitable aperture 30 is about 10–20 mm, preferably 15 mm, and a suitable beam is a rectangular beam of about 10 to about 20 mm in width and about 50 to about 100 micrometers in thickness at a focal plane with 5 to 10 mm focal depth.

Polarizer 18 is disposed prior to beam shaping optics 19, and is preferably a Glan-Thompson polarizer. Rotation of polarizer 18 provides a wide range of intensity levels that, in turn, yields different exposure levels on sample 34. For example, a distinct level of exposure can be provided every 5 degrees, which implies a total of 18 possible exposures. The inclusion of optional neutral density filter 16 can provide an additional intensity scale. Preferably, the polarizer is of the Glan-Thompson type with a high extinction coefficient. This extinction coefficient is about 1 to about 0.000001 (i.e., $1 \times 10^{-6}$), or better.

A paper titled "On a generalized Interference Equation and Interferometric Measurements," F. J. Duarte, Opt. Commun. 103, 8–14 (1993), incorporated herewith by reference, teaches that the intensity light pattern following passage through a wide slit can be described mathematically by representing the wide slit as being composed by an array of a large number of fine sub slits.

A feature of the present invention is the use of multiple-prism beam expander 26 to provide one-dimensional beam magnification. U.S. Pat. No. 5,255,069 (Duarte), commonly assigned and incorporated herewith by reference, teaches a suitable multiple-prism beam expander 26 for use with the present invention.

FIG. 3 shows a typical light pulse 30 in an intensity/temporal profile of a pulsed diode-pumped frequency-doubled Nd:YAG laser, with the temporal scale being 100 ns.

Wavelength agility can be achieved by using a tunable laser. Commercially available pulsed lasers provide stable intensity output. Publications have disclosed tunable lasers having less than 5 percent pulse variation. One laser manufacturer claims stabilities of 1 percent or better. The following two references, incorporate herewith by reference, relate to suitable tunable lasers: "Interferometric Imaging" F. J. Duarte in "Tunable Laser Applications", F. J. Duarte, Editor, Marcel-Dekker, New York, 1995, pp. 153–178; and "Tunable Lasers Handbook", edited by F. J. Duarte, Academic Press, New York, 1995.

In an alternate embodiment, the present invention may employ lasers emitting different wavelengths used in combination with beam splitters. FIG. 4 shows a plurality of lasers 40 and beam splitters 42 employed in conjunction with light source 12. The beam splitters are arranged on the optical axis to direct the beam of light from lasers 40 along the optical axis. For example, exposures at 477, 532, and 640 nm can be obtained using a blue, frequency doubled Nd:YAG laser, a green frequency doubled Nd:YAG laser, and a red diode laser.

Figure 5:
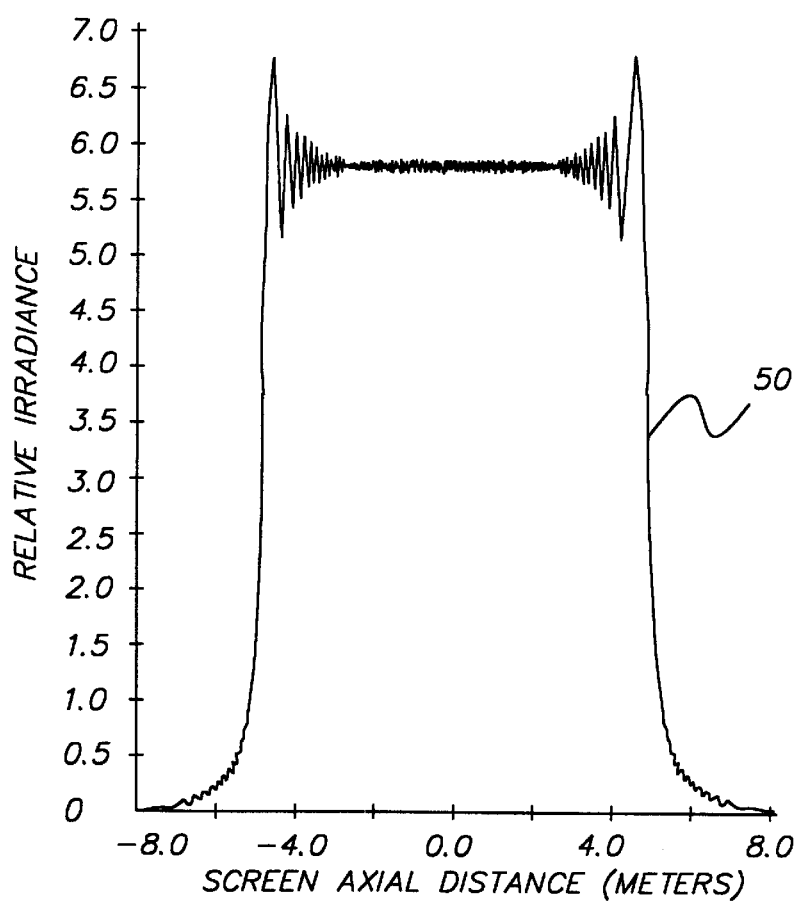
FIG. 5 shows a diagram depicting the calculated profile of an expanded beam incident on the surface the sample being exposed.

FIG. 5 shows a diagram depicting the calculated intensity profile 50 of an expanded beam incident on the surface of the sample being exposed.

In the book "Tunable Laser Applications", by F. J. Duarte, published by Marcel-Dekker, New York, 1995, a physical description for propagation from a source (s) to an interference plane (x), via a generalized grating (j), is given in two dimensions by:

$$\langle x | s \rangle = \sum_{z=1}^{N} \sum_{y=1}^{N} \langle x | j_{zy} \rangle \langle j_{zy} | s \rangle \quad \text{Equation 1}$$

wherein $\langle j_{yz} | s \rangle$ is the probability amplitude for electromagnetic beam propagation from the exit of multiple-prism beam expander (s) 26 to the generalized wide slit (j) 30; and $\langle x | j_{zy} \rangle$ is the probability amplitude for propagation from the generalized wide slit (j) 30 to the imaging plane (x) where the surface of sample 34 is located. By representing the probability amplitudes as classical wave functions in exponential form, the probability is given by multiplying $\langle x|s \rangle$ by its complex conjugate such that:

$$\langle x | s \rangle \langle x | s \rangle^* = \sum_{z=1}^{N} \sum_{y=1}^{N} \Psi(r_{j(zy)}) \sum_{q=1}^{N} \sum_{p=1}^{N} \Psi(r_{j(qp)}) e^{i(\Omega_{qp} - \Omega_{zy})} \quad \text{Equation 2}$$

For a one-dimensional case, Equation 2 reduces to:

$$\langle x | s \rangle \langle x | s \rangle^* = \sum_{j=1}^{N} \Psi(r_j)^2 + 2 \sum_{j=1}^{N} \Psi(r_j) \left[ \sum_{m=j+1}^{N} \Psi(r_m) \cos(\Omega_m - \Omega_j) \right] \quad \text{Equation 3}$$

Equation 3 of the present invention corresponds with Equation 13 of U.S. Pat. No. 5,255,069 (Duarte), commonly assigned and incorporate herewith, and provides a generalized equation applicable to any one-dimensional N-slit interference problem. The position of multiple-prism beam expander (s) 26 and imaging plane (x) (i.e., sample 34), relative to generalized wide aperture 30 is shown in FIG. 2. In Equation 3, (j) is used as a mathematical index to account for a large number of imaginary sub-slits making up the wide slit.

Applicants have discovered an excellent agreement between computer generated interferograms based in the quantum optics description given in Equation 3 and measured interference patterns. Examples are provided in the reference titled, "On a Generalized Interference Equation and Interferometric Measurements", F. J. Duarte, Opt. Commun. 103, pp. 8–14 (1993).

A method for exposing a sample of light sensitive material to provide a graded series of exposures of different intensity levels is now more particularly described with reference to FIG. 6. First, a Gaussian beam of light is generated (Step 100) and directed along optical axis 14. The Gaussian beam of light is directed through rotatable polarizer 18 (Step 101) and expanded (Step 102) into an elongated beam of light by means of beam shaping optics 19. The elongated beam of light is then projected through aperture 30 onto sample 34 (Step 103) wherein the sample is illuminated and exposed to form a line exposure, for example, about 25 to about 100 micrometers in height by about 10 to about 20 mm in width. To form other line exposures, the sample is displaced (Step 104) in a direction transverse to the propagation plane and transverse to the optical axis, and Steps 101–104 are repeated (Step 105) until an exposure area with the desired dimension is obtained. To form exposure lines of a different intensity level, the polarizer is rotated to change the intensity level (Step 106) and the steps of directing, expanding, projecting and displacing (Steps 107–110, respectively) are repeated (Step 111) until an exposure area of the different intensity level with the desired dimension is obtained. Steps 106–111 are repeated (Step 112) to obtain a graded series of exposures of different intensity levels.

An example of the present invention is now provided with reference to FIGS. 5 through 9. A calculated intensity pattern 50, shown in FIG. 5, corresponds with an interaction of a nearly plane wave at a wavelength of 532 nm with a 10 mm wide aperture 30. The nearly plane wave is achieved by means of the extremely elongated Gaussian beam. This wide slit is represented mathematically as being composed by some 125 equally spaced slits each 79 $\mu$m wide separated by 1 $\mu$m. The distance from the wide slit to the imaging plane is 40 cm and is a function of the convex lens 24 following telescope 20. Oscillations at the edge of the intensity profile 50 manifest themselves as a groove pattern at the edge of the line images with little practical effect or influence.

Figure 6:
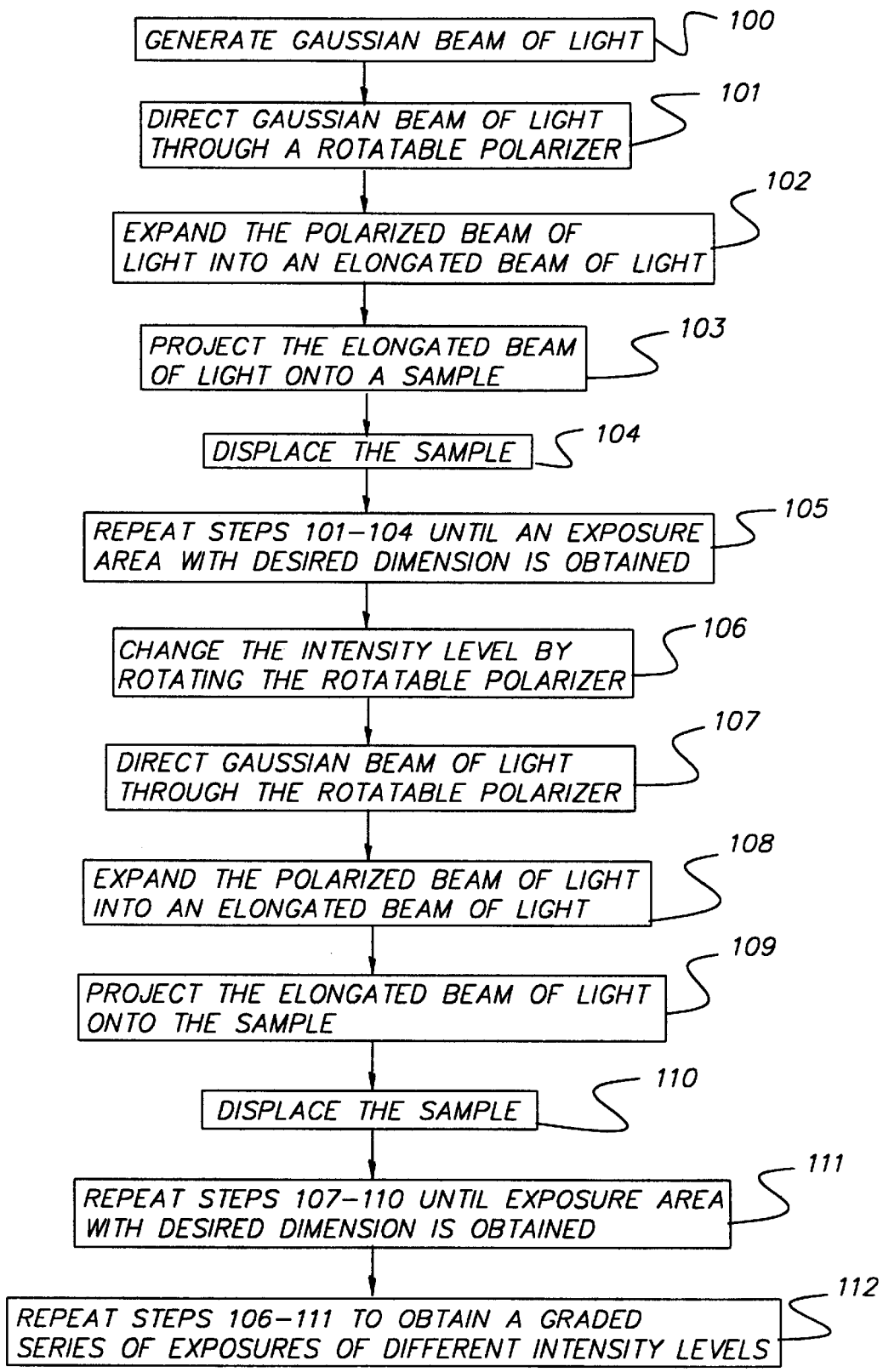
FIG. 6 shows a diagram illustrating a method of exposing a sample of light sensitive material to provide a graded series of exposures of different intensity levels in accordance with the present invention.
Figure 8:
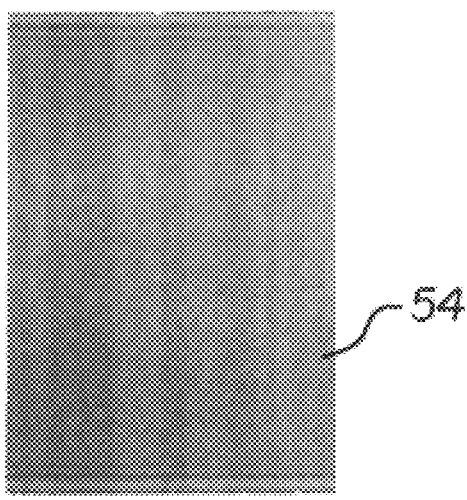
FIG. 8 shows a series of exposures at the same intensity level obtained with the electro-optical apparatus of the present invention.
Figure 9:
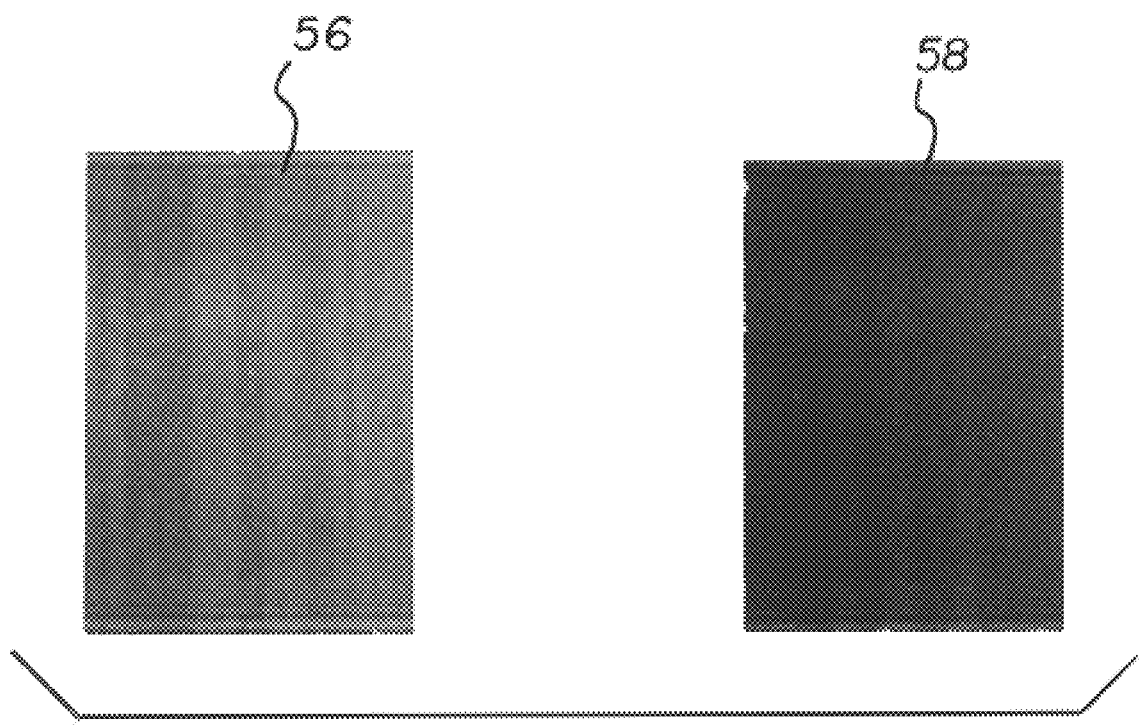
FIG. 9 shows a first series of line exposures at the same intensity level followed by a second series of line exposures at a different intensity level.

Correspondingly, FIG. 7 shows a single line exposure 52 on photographic paper created by the illumination of the beam profile whose calculated intensity profile is shown in FIG. 5 (Steps 101–103 of FIG. 6). Similarly, FIG. 8 shows a series of line exposures 54 on photographic paper created by the illumination of the beam profile whose calculated intensity profile shown in FIG. 5 (Steps 101–104 of FIG. 6). Note that the series of exposures is induced by displacing the unexposed photographic paper in a direction perpendicular to the propagation plane and the optical axis. Further, FIG. 9 shows a first series of line exposures 56 on photographic paper, created by the illumination of the beam profile shown in FIG. 5, followed by a second series of line exposures 58 at a different light intensity level (Steps 101–111 of FIG. 6). The different light intensity level is achieved by a 5 degree rotation of the Glan-Thompson polarizer 18.

The apparatus and method described herein are illustrative of the general principles of the invention. Modifications may readily be devised by those skilled in the art without departing from the spirit and scope of the invention. The invention is not limited to a particular polarizer, arrangement of optical elements, propagation distances, wavelength, beam expansion factor, beam dimensions, or slit dimensions. The imaging surface to be exposed can be for example, photographic film, photographic paper, digital imaging paper, or any type of photosensitive imaging surface.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 electro-optical apparatus
12 light source 14 optical axis
16 filter
17 rotation means
18 polarizer
19 beam shaping optics
20 telescope
22 beam from beam-shaping optics
24 convex lens
26 expander
28 beam from expander
30 slit
31 opaque material
32 central portion of beam
34 sample
36 displacement means
38 light pulse
40 laser(s)
42 beam splitter(s)
50 intensity pattern
52 single exposure line
54 a series of exposure lines at one intensity level
56 a series of exposure lines at a first intensity level
58 a series of exposure lines at a second intensity level

What is claimed is:

1. An electro-optical apparatus, comprising:
a light source adapted to provide a Gaussian beam of light directed along an optical axis;
beam shaping optics disposed in the optical path and adapted to expand the Gaussian beam of light into an elongated beam of light and to project the elongated beam of light along the optical axis toward a sample;
an aperture disposed intermediate the beam shaping optics and the sample to provide a symmetric beam of light; and,
a rotatable polarizer disposed in the optical path intermediate the light source and the beam shaping optics to vary the intensity level of the beam of light.

2. The electro-optical apparatus according to claim 1 wherein the light source is a pulsed laser, polarized parallel to the plane of propagation.

3. The electro-optical apparatus according to claim 2 wherein the pulsed laser is a diode-pumped frequency-doubled Nd:YAG laser, a pulsed solid-state laser, or a semiconductor laser.

4. The electro-optical apparatus according to claim 1 wherein the light source is adapted to provide pulses of the Gaussian beam of light of temporal duration from 10 ns to 1000 ns.

5. The electro-optical apparatus according to claim 1 further comprising displacement means for displacing the sample in a direction transverse to the optical axis and transverse to the propagation plane.

6. The electro-optical apparatus according to claim 1 wherein the beam shaping optics expands the Gaussian beam of light into a width of about 30 to about 50 mm.

7. The electro-optical apparatus according to claim 1 wherein the aperture is has a width of about 10 mm and provides for the transmission of the central portion of the elongated beam of light.

8. The electro-optical apparatus according to claim 1 wherein the aperture is configured such that the symmetric beam of light of about 10 to about 20 mm in width and about 25 to about 100 $\mu$m in thickness when impinging the sample.

9. The electro-optical apparatus according to claim 1 wherein the light source is a tunable laser.

10. The electro-optical apparatus according to claim 1 further comprising a laser emitting a beam of light having a wavelength different than the beam of light from the light source.

11. The electro-optical apparatus according to claim 10 further comprising a beam splitter disposed on the optical axis to direct the beam of light from the laser along the optical axis.

12. The electro-optical apparatus according to claim 1 further comprising a plurality of lasers with each laser emitting a beam of light, the light source and each laser emitting a beam of light have a different wavelength.

13. The electro-optical apparatus according to claim 1 wherein the polarizer is a Glan-Thompson polarizer.

14. The electro-optical apparatus according to claim 1 wherein the beam shaping optics includes a telescope, a convex lens, and a multiple-prism beam expander.

15. The electro-optical apparatus according to claim 14 wherein the convex lens is disposed intermediate the telescope and the multiple-prism beam expander.

16. An electro-optical apparatus for exposing a sample of light sensitive material to provide a graded series of exposures of different intensity levels, comprising:
a light source adapted to provide a Gaussian beam of light directed along an optical axis;
beam shaping optics disposed in the optical path and adapted to expand the Gaussian beam of light of the light source into an elongated beam of light and to project the elongated beam of light along the optical axis toward a sample;
an aperture disposed intermediate the beam shaping optics and the sample to provide a symmetric beam of light; and,
a polarizer rotatable about the optical axis and disposed in the optical path intermediate the light source and the beam shaping optics to vary the intensity level of the beam of light.

17. A method for exposing a sample of light sensitive material to provide a graded series of exposures of different intensity levels, the method comprising the steps of:
generating a Gaussian beam of light directed along an optical axis toward a sample of light sensitive material
disposing beam shaping optics in the optical path and adapted to expanding the Gaussian beam of light;
directing the generated Gaussian beam of light through a rotatable polarizer;
expanding the polarized beam of light into an elongated beam of light by beam shaping optics, wherein an aperture is disposed intermediate beam shaping optics and the sample to provide a symmetric beam of light;
projecting the elongated beam of light onto the sample;
displacing the sample in a plane transverse to the optical axis; and
repeat the steps of directing, expanding, projecting, and displacing until an exposure area with a desired dimension is obtained.

18. The method according to claim 17 further comprising the steps of
rotating the rotatable polarizer to change the intensity level of the beam of light directed through the polarizer;
repeating the steps of directing, expanding, projecting, and displacing until a further exposure area with a desired dimension is obtained.

19. The method according to claim 18 further comprising the step of repeating the steps of rotating, directing, expanding, projecting, and displacing until a graded series of exposures of different intensity levels is obtained.

* * * * *